(12) United States Patent  (10) Patent No.: US 7,765,904 B2
Tejeda  (45) Date of Patent: Aug. 3, 2010

(54) SYSTEM AND METHOD FOR PERFORMING MACHINING OPERATIONS

(76) Inventor: Maximo Tejeda, 8640 N. Green River Dr., Houston, TX (US) 77028

( * ) Notice: Subject to any disclaimer, the term of this patent is extended or adjusted under 35 U.S.C. 154(b) by 142 days.

(21) Appl. No.: 12/132,646

(22) Filed: Jun. 4, 2008

(65) Prior Publication Data
US 2009/0304471 A1    Dec. 10, 2009

(51) Int. Cl.
*B23B 3/00*    (2006.01)
*B23B 23/04*    (2006.01)
(52) U.S. Cl. ......................................... 82/1.11; 82/150
(58) Field of Classification Search ................... 82/117, 82/150, 164, 129, 124, 1.11
See application file for complete search history.

(56) References Cited
U.S. PATENT DOCUMENTS

| | | | |
|---|---|---|---|
| 1,846,270 A * | 2/1932 | Olson | 33/501.14 |
| 3,120,725 A * | 2/1964 | Milewski et al. | 451/398 |
| 3,938,374 A | 2/1976 | Wadsworth, Jr. | |
| 4,038,740 A | 8/1977 | Grinage | |
| 4,046,774 A | 9/1977 | Plevyak | |
| 4,064,774 A * | 12/1977 | Maddock | 82/170 |
| 4,198,885 A | 4/1980 | Grinage | |
| 4,693,105 A | 9/1987 | Lee, Jr. | |
| 4,966,058 A | 10/1990 | Garombo | |
| 6,810,777 B1 * | 11/2004 | Baumann | 82/129 |
| 7,011,002 B2 * | 3/2006 | Wirth et al. | 82/142 |
| 2003/0029285 A1 * | 2/2003 | Wirth et al. | 82/117 |
| 2007/0295175 A1 * | 12/2007 | Akiyama | 82/117 |

* cited by examiner

*Primary Examiner*—Will Fridie, Jr.

(57) ABSTRACT

A system and method for performing machining operations on first and second ends of an elongate workpiece, the system comprising a support for the workpiece which has first and second, spaced sides, each of which has first and second spaced ends, a first machining tool disposed proximate the first end of the first side for performing a first machining operation on a first end of the workpiece, a second machining tool being positioned proximate the second end of the second side for performing a second machining operation on a second side of the workpiece, the first and second machining tools being mirror images of one another.

18 Claims, 4 Drawing Sheets

SYSTEM AND METHOD FOR PERFORMING MACHINING OPERATIONS

FIELD OF THE INVENTION

The present invention relates to a system and method for performing machining operations. More specifically, the present invention relates to a system and method for performing machining operations on an elongate workpiece.

BACKGROUND OF THE INVENTION

In the oil and gas industry, numerous types of tubular members are employed as, for example, in the drilling, completing and producing aspects of oil and gas wells. Among the tubular members employed are tubing and casing. In the manufacture of these oilfield tubulars, e.g., tubing or casing, it is typical to start with a piece of unthreaded or green pipe and cut male or pin threads on both ends of the pipe (pin-x-pin). In use, the pin-x-pin pipe sections are connected to one another by a coupling, typically a relatively short tubular member having a female thread or box connection at each end, to form a tubing or casing string.

In a typical threading line for tubing, casing or the like, a load of pipe is deposited on a rack or table. The pipe, referred to as green pipe, is then indexed onto a conveyor which can both rotate and translate the pipe into a first threading station comprising a lathe until it contacts a pipe stop at which time the chucks on the lathe clamp the pipe and the threading cycle begins to cut the desired threads on that end of the green pipe. Following threading of one end of the first end of the green pipe, the pipe moves to an inspection station which typically can comprise popup rollers which slowly rotate the pipe while it is gauged and de-burred, if necessary. Upon completion of inspection, the pipe moves onto a second threading station when the identical chain of events occurs vis-à-vis threading and inspecting. After inspection, the fully threaded pipe moves to a blowout station where coolant and chips are blown out of the pipe by compressed air. Upon completion of blowout, the fully threaded pipe rolls down to a bucking unit table and is fed into a bucking unit where a coupling is generally bucked onto the pipe. After the coupling is bucked onto the pipe and it is end area drifted, the pipe is discharged and rolls down to an outbound conveyor. It is then indexed onto discharge lay racks and can be subsequently subjected to hydrotesting, full-length drift, weight-tally, stenciling, etc.

FIG. 1 shows a typical prior art threading line for threading pipe to produce tubing used in oil and gas wells. Referring then to FIG. 1, there is shown a support or table comprised of spaced rails 10, 12 or other similar members forming a first support side, e.g., the side of rail 10, and a second support side, e.g., the side of rail 12. As seen, the rails 10, 12 are spaced from one another and generally parallel. Rail 12 has a first end 14 and a second end 15 while rail 12 has a first end 17 and a second end 18. Proximate but laterally spaced from first end 14 of rail 10 is a first work station $W_1$ which in the embodiment shown comprises a first lathe 16. A lathe operator $P_1$ is positioned at workstation $W_1$ to operate the lathe 16. Disposed proximate but laterally spaced from the second end 18 of rail 12 is a second workstation $W_2$ which comprises a second lathe 20, a second, lathe operator $P_2$ being positioned at workstation $W_2$ to operate lathe 20.

In the threading operation, the unthreaded pipe sections 22 are held in a rack or feed table comprised of rack members 24 and 26. To commence the operation, a pipe section 22 is indexed in the direction of arrow A along the racks 24, 26 where it drops onto rollers 28 and 30 which form part of a conveyor system well known to those skilled in the art and which can rotate and translate the pipe section 22. As can be seen rollers 28 and 30, are in spaced relationship to one another and are generally aligned with the chucks 32 and 33 on lathe 16. The conveyor comprising rollers 28 and 30 move the pipe section 22 in the direction of arrow B through the chucks 32 and 33 against a stop (not shown) in lathe 16, such that the end 22A of the pipe section 22 is in a position to be contacted by a thread cutting insert 34 carried on a tool post (not shown) on lathe 16 but well understood by those skilled in the art. In the system shown in FIG. 1, the lathe 16 is cutting male or pin threads on the end 22A of pipe section 22. To this end, the pipe section 22 is rotated as the thread cutting insert 34 is moved in the direction of arrow B such that cutting insert 34 cuts an external, helical thread on end 22A of pipe section 22.

Once end 22A has been threaded, the pipe section 22 is released from the chucks 32, 33 and now moved by the conveyor in a direction opposite arrow B onto rails 10 and 12. The pipe section 22, having had end 22A threaded moves in the direction of arrow A to an inspection station where an inspector $I_1$ inspects the threads. Following inspection, the pipe section 22 continues movement in direction A toward the second ends 15, 18 of rails 10, 12, respectively. As shown in FIG. 1, there may be several sections of pipe 22 which have had end 22A threaded. In any event, pipe sections 22 having end 22A threaded are held, in the well known manner, until it is time for the opposite end 22B of a pipe section 22 to be threaded. At such time as threading on end 22B can commence, the pipe section 22 is indexed onto a second conveyor system comprised of driven rollers 36 and 38. As with rollers 28, 30, rollers 36 and 38 are generally in line with chucks 40 and 42 of lathe 20 located at workstation $W_2$. Pipe section 22 is now moved in the direction of arrow C by the conveyor system such that the second end 22B of pipe section 22 moves through the chucks 40, 42 of lathe 20 to a stop position in lathe 20 wherein a thread cutting insert 44 carried by the tool post on lathe 20 can now engage end 22B and, as pipe section 22B rotates, cut male or pin end threads on end 22B of pipe 22 as described above with respect to end 22A. When threading of end 22B is complete, pipe 22 is now moved in the direction opposite arrow C such that the end 22B is no longer in lathe 20. The fully threaded pipe section 22 is then moved onto racks 44 and 46 to an inspection station where inspector 12 can now inspect the threads cut on end 22B. Following inspection, the fully threaded pipe section 22B can be subjected to further operations as described above.

As can be seen from the above description, the conventional, prior art method of machining, e.g., threading, an elongate member, e.g., a pipe, on both ends, is labor intensive in as much as it requires two machine (lathe) operators and two inspectors. In this regard, because of the positioning of worker $P_1$ relative to workstation $W_1$, operating the lathe 16 and inspecting the threaded end of the pipe cannot be done by worker $P_1$ necessitating the need for inspector $I_1$.

SUMMARY OF THE INVENTION

In one aspect the present invention provides a system for performing machining operations on first and second ends of an elongate workpiece, the system having a support or table for the workpiece, the support having first and second spaced sides, each of the first and second spaced sides having first and second ends. A first machining tool is disposed proximate the first end of the first side, while a second machining tool is disposed proximate the second end of the second side. The first and second machining tools are mirror images (hereinafter defined) of one another.

In another aspect, the present invention provides a method for performing machining operations on first and second ends of an elongate workpiece. In the method, a support or table is provided for the workpiece, the support having a first side with first and second ends, and a second side with first and second ends. A first machine tool is provided proximate the first end of the first support side while a second machine tool is provided proximate the second end of the second support side. The first and second machine tools are mirror images of one another. The method further includes providing an elongate workpiece having a first end and second end. According to the method, the workpiece is aligned with the first machine tool and a first end of the workpiece moved into the machine tool and machined. The workpiece is then moved away from the first machine tool and along the support toward the second machine tool. The workpiece is then aligned with the second machine tool and the second end of the workpiece moved into the second machine tool and machined. The machine workpiece is then moved away from the second machine tool.

The foregoing objects, features and advantages of the present invention, as well as others, will be more fully understood and better appreciated by reference to the following drawings, specification and claims.

DETAILED DESCRIPTION OF PREFERRED EMBODIMENTS

Figure 1:
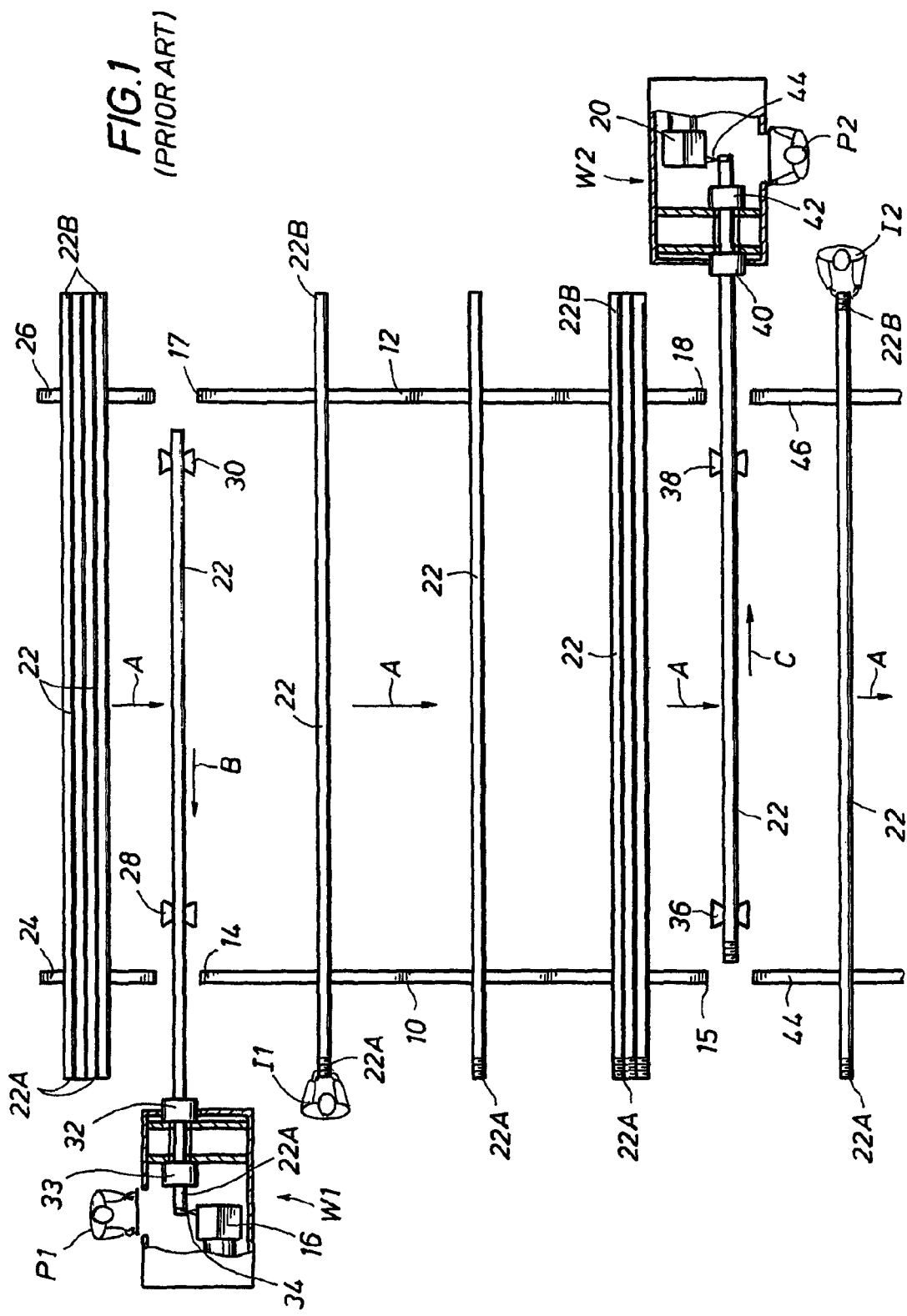
FIG. 1 is a simplified, schematic top view of a prior art system for performing threading operations on tubular members.

While the invention will be described below with respect to the threading of a pipe section to form male threads on each end, i.e., a pin-by-pin connection, the invention is not so limited. For example, any kind of a first machining operation could be conducted on one end of the pipe and another kind of machining operation conducted on the other end of the pipe. A classic example of this would be in the manufacture of so-called integral joint connections used, for example, in oilfield tubulars where there is a pin connection on one end and a box connection on the other end. Additionally, although the invention is described with respect to the threading of a tubular workpiece, again it is not so limited. In this regard, solid bar stock could comprise the workpiece and a wide variety of machining operations performed.

As noted above, the machine tools employed in the system and method of the present invention are mirror images of one another. As used herein, the term "mirror images" is intended to mean that the machine tools are mirror images in the sense that when they are placed in side-by-side juxtaposition, i.e., in left, right relationship, one end of the workpiece would be machined by the machine tool on the left and the other end of the workpiece would be machined by the machine tool on the right and the operators of both of the machine tools would be facing in the same direction, i.e., the operator of the left-side machine tool would be side by side with the operator of the right-side machine tool, the workpiece being to the right of the operator of the left-side machine tool, the workpiece being to the left of the operator of the right-side machine tool. Accordingly, mirror image is not intended to mean that each feature or component on the first machine tool, e.g., the left-side machine tool, will have an identical, mirror image feature or counterpart on the second machine tool, e.g., the right-side machine tool. For example, in the case outlined above where a pin end is being cut on one end of the workpiece and a box end on the other end of the workpiece, the first machine tool, e.g., the left-side machine tool cutting the pin threads would have an external thread cutting insert while the second machine tool, e.g., the right side machine tool, cutting the female threads would have an internal thread cutting tool, e.g., a boring bar. However, for the most part and since generally the two machine tools will be of the same kind, e.g., lathes, mills, etc., there will be close if not identical mirror image correspondence between the two machine tools. In simplified terminology, it can be considered that one of the machine tools is "left handed" while the other one is "right handed." In this regard and by way of example only, lathes whether manual, CNC, or the like, are right handed in the sense that the operator thereof is positioned relative to the lathe such that the workpiece enters or is held by the lathe on the left-hand side while the tailstock of the lathe is on the right-hand side, both with respect to the operator, it being understood that the operator is on the "front side" of the lathe. Indeed, and again with respect to using a lathe as an example, a typical prior art lathe has a front or operator side, a back side, a left side which holds the workpiece and a right side which carries the tailstock.

Figure 2:
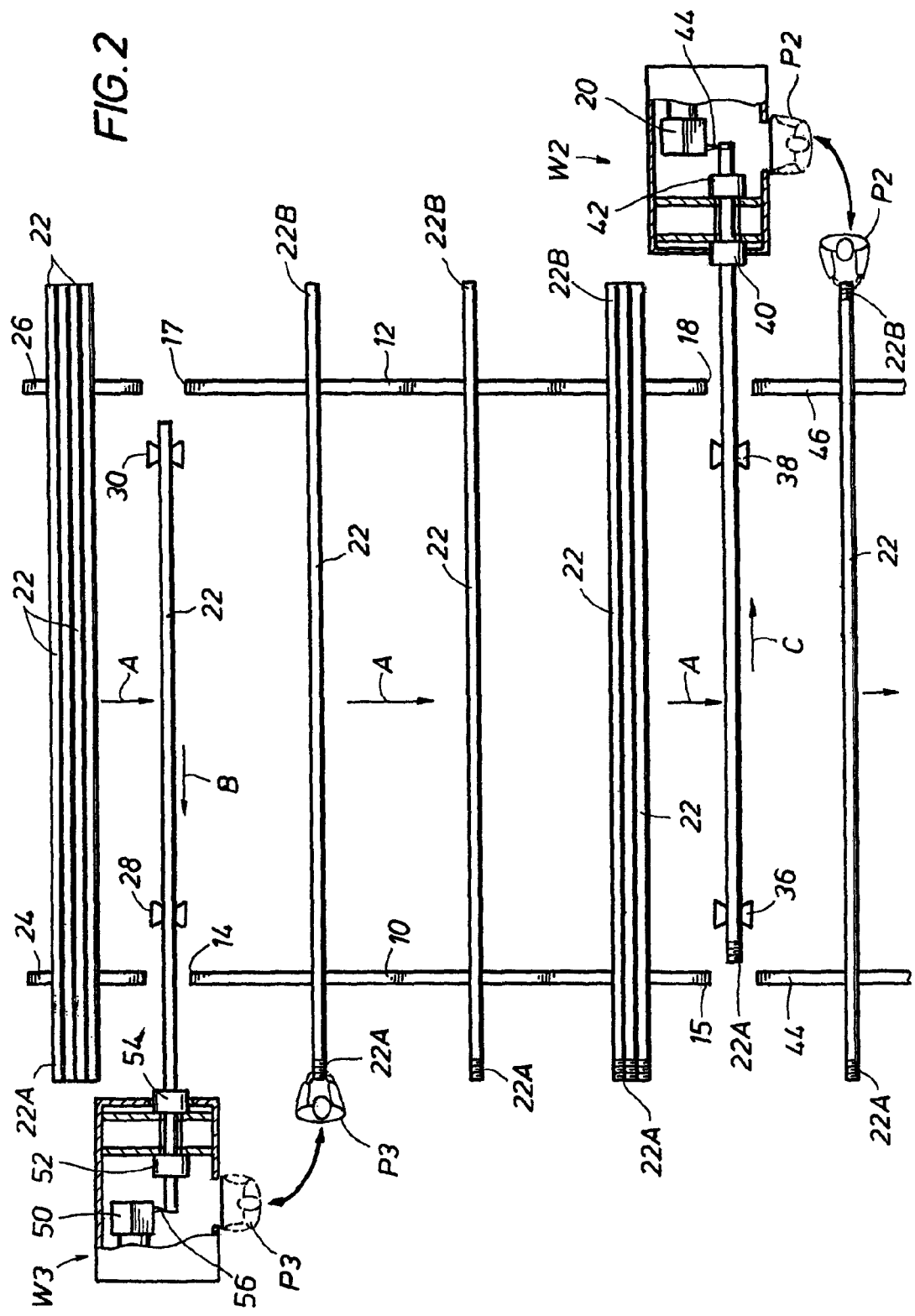
FIG. 2 is a view similar to FIG. 1 but showing the system of the present invention.

Reference is now made to FIG. 2 for a description of one embodiment of the system and method of the present invention. In FIGS. 1 and 2, like character references have been used to identify like parts or components. As can be seen by comparing FIGS. 1 and 2, the system of the present invention as shown in FIG. 2 differs from the prior art system shown in FIG. 1, in that workstation $W_1$ of the prior art system has been replaced with workstation $W_3$. Workstation $W_3$ comprises a machine tool, e.g., a lathe 50, having inner and outer chucks 52 and 54, a thread cutting insert 56 being carried by a tool post on lathe 50 for cutting a male thread on the end 22A of pipe section 22. A significant difference between the prior art system shown in FIG. 1 and that shown in FIG. 2 is that in the embodiment shown in FIG. 2 operator $P_3$ is now positioned relative to lathe 50 such that the chucks 52, 54 are to operator $P_3$'s right and the workpiece, i.e., the pipe section 22 enters the lathe from the right again as viewed from the perspective of operator $P_3$. Additionally, unlike the prior art embodiment shown in FIG. 1 wherein, when viewed from the perspective of operator $P_1$ facing the operating side of lathe 16, the tailstock is to the right of operator $P_1$, in the case of the embodiment of the invention shown in FIG. 2, the tailstock of lathe 50, when viewed from the perspective of the operator $P_3$ standing on the operating side of the lathe 50, is to the left.

As noted above in describing the prior art system shown in FIG. 1, since inspection of freshly cut threads is important in the manufacturing operation for efficiency purposes in terms of moving the pipe sections 22 through the threading process, in addition to operator $P_1$, it was also necessary to have an inspector $I_1$ to inspect the freshly cut threads. In this regard and with respect to the prior art system shown in FIG. 1, it is not practical for operator $P_1$, once the threading operation on end 22A has been completed to move around workstation $W_1$ to the position of inspector $I_1$ to inspect the threads. In contrast, in the case of workstation $W_3$, operator $P_3$, because of his positioning relative to workstation $W_3$ and workpiece 22, can readily inspect the freshly cut threads on end 22A of workpiece 22. In effect, operator $P_3$ also becomes an inspector and thereby eliminates inspector $I_1$. This saving in manpower is obviously a significant economic advantage.

It will be understood that the pipe threading system vis-à-vis the conveyors, lay table, the support or table, etc., are all well known to those skilled in the art and are very common in a threading line for pipe of all types, whether it be in the oil and gas industry or in any other industry. For example, while the system has been shown as having basically two support members or rails forming the support for the pipe as it moves through the threading process, it will be appreciated that more support of rail members can be employed, depending upon the length of the workpiece, e.g., the pipe. Although not described above, it will be appreciated that the pipe threading system of the present invention can and will probably include limit switches, stops and other components all designed to manipulate the pipe section, e.g., rotating, translating, indexing, etc., of the pipe sections. Such components are also well known to those skilled in the art.

Figure 3:
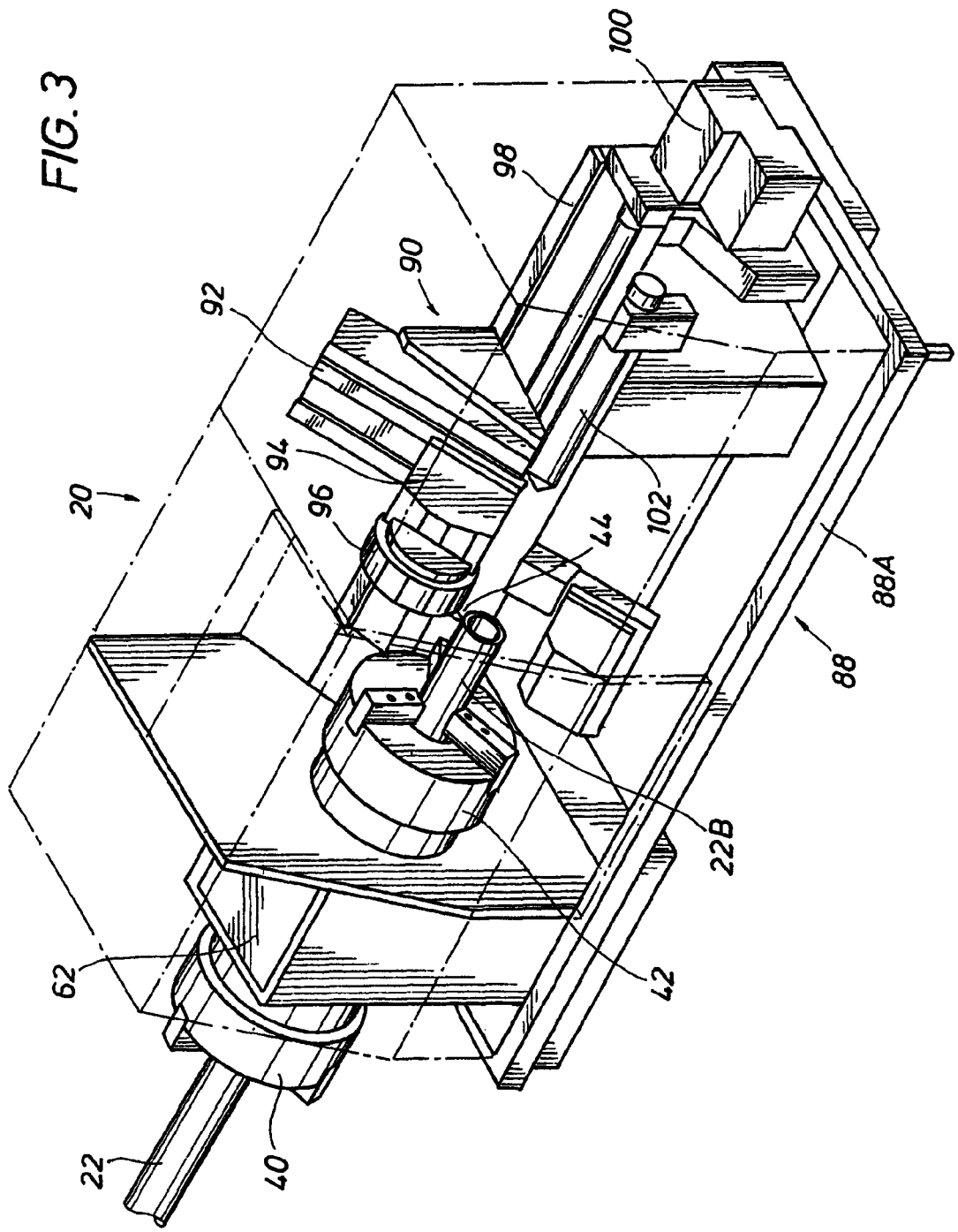
FIG. 3 is a simplified, perspective view of a typical prior art, first lathe used in one aspect of the present invention.
Figure 4:
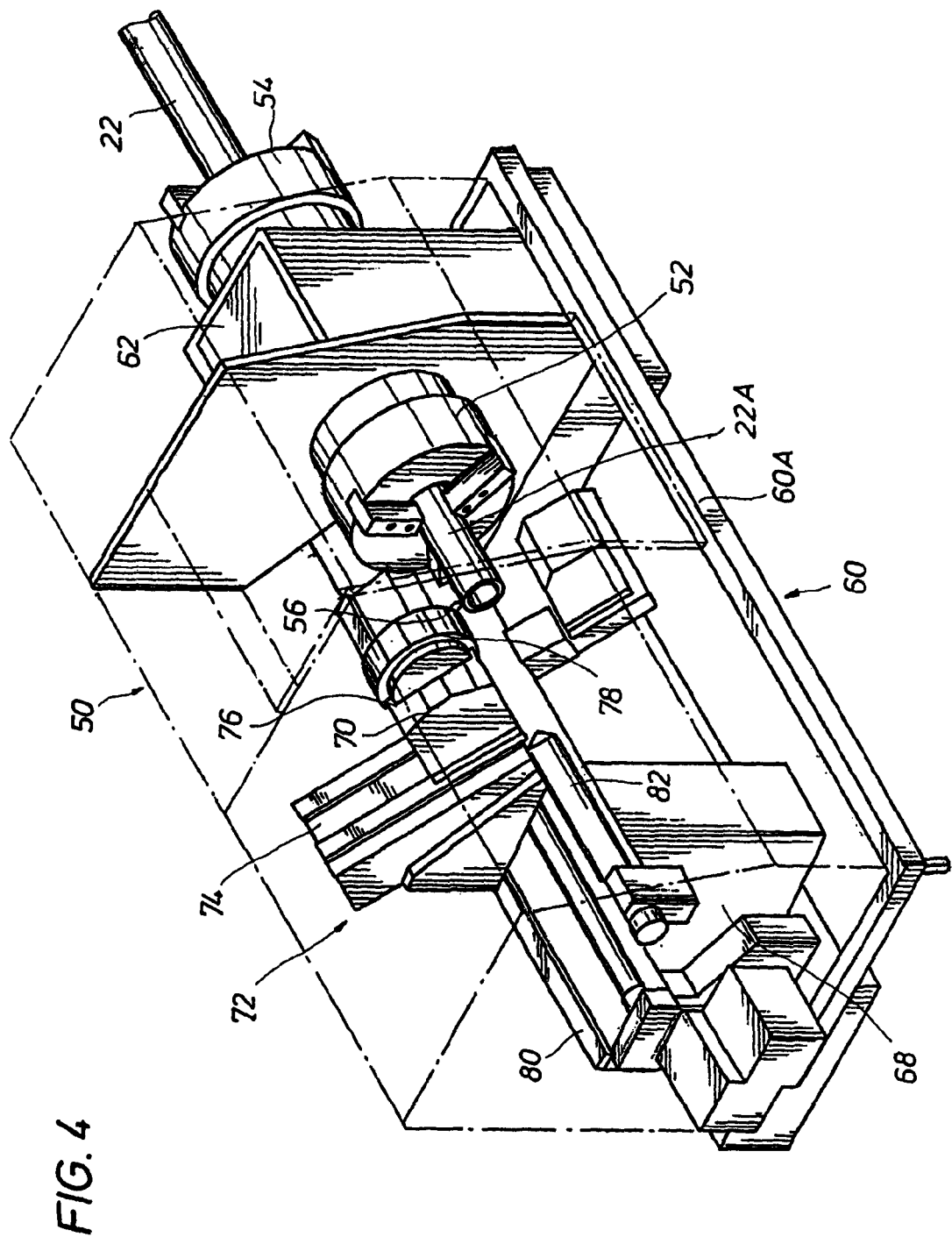
FIG. 4 is a simplified, perspective view of a second lathe used in one aspect of the present invention.

Turning to FIGS. 3 and 4, there is shown in greater detail lathes 20 and 50, lathe 50 being shown in FIG. 4, lathe 20 being shown in FIG. 3. As can be seen from FIG. 4, lathe 50 which is located at workstation $W_3$ comprises a bed, shown generally as 60, and a headstock 62 comprised of inner and outer chucks 64 and 66, respectively. Lathe 50 also includes a tailstock shown generally as 68. A carriage, shown generally as 72, comprises a crossslide 74 and a tool post holder 76 which carries a tool post 78 on which is carried the thread cutting insert 56. Carriage 72, also includes a saddle 80. Lathe 50 also includes a live center 82 which is inserted into the end 22A of the pipe during the threading operation to ensure concentricity during the threading operation.

In the lathe shown in FIG. 4, i.e., lathe 50 located at workstation $W_3$, operator $P_3$ would be positioned relative to lathe 50 such that as operator $P_1$ faced the front 60A of bed 60 which is the "operating side" of lathe 50, the tailstock 68 and live center 82 would be generally to the left of operator $P_3$ while the headstock 62 and chucks 64 and 66 would be generally to the right of operator $P_3$. Thus, lathe 50 can be termed a "left-hand lathe."

Turning now to FIG. 3, the lathe 20 is shown in greater detail. Lathe 20 includes a bed shown generally as 88 having a front or working side 88A. Lathe 20 also includes a headstock 62 upon which are mounted inner and outer chucks 42 and 40, respectively, the carriage shown generally as 90 including a crossslide 92 and a tool post holder 94 carrying a tool post 96, upon which cutting insert 44 is mounted, the tool post holder 94 being movable along saddle 98 between headstock 62 and tailstock 100. Lathe 20 also includes a live center 102.

In the case of lathe 20, operator $P_2$ would be positioned such that when operator $P_2$ was facing the front or working side 88A of lathe 20, the tailstock including chucks 40 and 42 would be generally to operator $P_2$'s left, while the tailstock 100 and live center 102 would be generally to operator $P_2$'s right. Thus lathe 20 can be considered a conventional or "right-hand lathe."

In the system and method of the present invention, and as can be deduced from FIG. 2, if lathes 20 and 50 were positioned in side-by-side juxtaposition rather than being diagonally spaced down the length of the threading line, lathe 20 being at the beginning of the threading line, lathe 50 being at the end of the threading line, chuck 40 of lathe 20 and chuck 54 of lathe 50 would be proximate one another. Thus, the front or working side 88A of lathe 20 and the front or working side 60A of lathe 50, would both be on the same side of the side-by-side positioned lathes. As can also be seen from comparing FIGS. 3 and 4, lathes 20 and 50, when positioned in side-by-side justaposition with outer chucks 40 and 54, respectively, being proximate or adjacent one another, are in fact true mirror images of one another. Thus all of the components of lathe 20 find mirror image correspondence with the components of lathe 50 when arranged in side-by-side juxtaposition as described above. As noted above, mirror image is not intended to be limited to exact, mirror image correspondence, a prime example being where one of the lathes 20 or 50 is cutting a male or pin end on the pipe section and the other of the lathes 20 or 50 is cutting a female or box end on the other end of the pipe section. In such a case, the lathe cutting the pin end on pipe section 22 would have a cutting insert as shown on either lathe 20 or 50 while the other lathe would have a boring bar (not shown).

As used herein the term "elongate workpiece" refers to a workpiece which has a length and/or weight such that manual manipulation to machine both the first and second ends of the workpiece is not feasible from a practical and safety perspective. Typically, such an elongate workpiece would have a length, depending upon weight, of greater than 10 feet, more generally greater than 20 feet, and even still more generally greater than 30 feet up to about 40 feet or longer. In this regard, oilfield tubing and casing is generally classified as R1, R2 and R3 wherein, in the case of casing, R1 refers to lengths of 16 to 25 feet, R2 refers to lengths of 25-34 feet, and R3 refers to lengths of 34 to 48 feet. In the case of tubing, R1 refers to lengths of 20 to 24 feet, while R2 refers to lengths of 28 to 32 feet.

The foregoing description and examples illustrate selected embodiments of the present invention. In light thereof, variations and modifications will be suggested to one skilled in the art, all of which are in the spirit and purview of this invention.

What is claimed is:

1. A system for performing machining operations on first and second ends of an elongate workpiece having a long axis comprising:
   a support for said workpiece, said support having first and second, spaced sides, each of said first and second sides having first and second ends;
   a first machining tool being disposed proximate said first end of said first side for performing a first machining operation on a first end of said workpiece;
   a second machining tool being disposed proximate said second end of said second side for performing a second machining operation on a second end of said workpiece, whereby said first and second machining tools are generally diagonally positioned with respect to one another and said support, said first and second machining tools being mirror images of one another, said support permitting movement of said workpiece in a direction substantially perpendicular to said long axis from a first position, wherein said first end of said workpiece is aligned with said first machining tool to a second position, wherein said second end of said workpiece is aligned with said second machining tool.

2. The system of claim 1, wherein said first and second machining tools comprise lathes.

3. The system of claim 1, further including a first assembly facilitating movement of said first end of said workpiece towards first machine tool and a second assembly for facilitating movement of said second end of said workpiece toward said second machine tool.

4. The system of claim 3, wherein said first and second assemblies comprise conveyors.

5. The system of claim 1, wherein said first side comprises a first support member and said second side comprises a second support member.

6. The system of claim 5, wherein said first and second support members comprise rails.

7. The system of claim 5, wherein said first and second support members are generally parallel to one another.

8. A method of machining an elongate workpiece comprising:
- providing a support for said workpiece, said support having a first side with first and second ends and a second side with first and second ends;
- providing a first machine tool proximate said first end of said first support side, and a second machine tool proximate said second end of said second support side, said first and second machine tools being mirror images of one another;
- providing an elongate workpiece having a long axis, a first end and a second end;
- aligning said long axis of said workpiece with said first machine tool;
- moving said first end of said workpiece into said machine tool and machining said first end of said workpiece;
- moving said workpiece away from said first machine tool;
- moving said workpiece along said support in a direction generally perpendicular to said long axis, toward said second machine tool;
- aligning said long axis of said workpiece with said second machine tool;
- moving said second end of said workpiece into said second machine tool and machining said second end of said workpiece; and
- moving said workpiece away from said second machining tool.

9. The method of claim 8, wherein said first and second machine tools are lathes.

10. The method of claim 8, wherein said elongate workpiece comprises a tubular member.

11. The method of claim 8, comprising providing a first assembly for facilitating movement of said first end of said workpiece toward and away from said first machine tool and a second assembly for facilitating movement of said second end of said workpiece toward and away from said second machine tool.

12. The method of claim 8, wherein said first and second assemblies comprise conveyors.

13. The method of claim 8, wherein said machining comprises threading.

14. The method of claim 8, comprising providing that said support comprises a first support member forming said first side and a second support member comprising said second side.

15. The method of claim 14, comprising providing that said first support member comprises a first rail and said second support member comprises a second rail.

16. The method of claim 14, comprising providing that said first and second support members are generally parallel to one another.

17. The method of claim 12, wherein said threading comprises forming a male thread on each of said first and second ends of said workpiece.

18. A method of machining an elongate workpiece comprising:
- providing a first machine tool and a second machine tool, said first and second machine tools being mirror images of one another;
- providing an elongate workpiece having a first end and a second end;
- aligning said workpiece with said first machine tool;
- moving said first end of said workpiece into said machine tool and machining said first end of said workpiece;
- moving said workpiece away from said first machine tool;
- moving said workpiece along said support in a direction perpendicular to said long axis;
- aligning said long axis of said workpiece with said second machine tool;
- moving said second end of said workpiece into said second machine tool and machining said second end of said workpiece; and
- moving said workpiece away from said second machining tool.

* * * * *